April 7, 1964     H. PACKARD     3,128,044
VARIABLE TRANSFORMER

Filed Nov. 1, 1961     3 Sheets-Sheet 1

INVENTOR.
HENRY PACKARD
BY Kenway, Jenney & Hildreth

ATTORNEYS

INVENTOR.
HENRY PACKARD

United States Patent Office 3,128,044
Patented Apr. 7, 1964

3,128,044
VARIABLE TRANSFORMER
Henry Packard, Norwood, Mass., assignor to Northrop Corporation, Beverly Hills, Calif., a corporation of California
Filed Nov. 1, 1961, Ser. No. 149,365
6 Claims. (Cl. 336—135)

My invention relates to electrical transducers, and particularly to an improved variable transformer.

Variable transformers are widely used as transducers for producing an electrical signal in response to the angular displacement of a rotatable element with respect to a support. As a typical example, the rotor of such a transformer may be connected to the gimbal of a gyroscope, and the stator connected to the casing in which the gimbal is mounted, to develop an electrical voltage corresponding in phase and magnitude to the sense and extent, respectively, of the angular displacement of the gimbal with respect to the casing. A linear relationship between the magnitude of the electrical voltage and the angular displacement of the rotatable element is highly desirable, because any non-linearity would normally require the addition of compensating networks. It is the object of my invention to improve the linearity of variable transformers.

Briefly, a variable transformer in accordance with my invention comprises a first ferromagnetic element, provided with projecting pole pieces on which primary and secondary windings are disposed, and a second ferromagnetic element provided with projecting teeth. These elements are mounted for relative movement so that coupling between the primary and secondary windings is provided which varies in dependance on the position of the teeth of the second element with respect to the pole pieces of the first. The primary and secondary windings are arranged on the pole pieces of the first element, in a novel manner to be described in detail below, such that, with an alternating voltage applied to the primary winding, at a reference relative position of the first and second elements, no net voltage is induced in the secondary windings. However, when one of the elements is displaced relative to the other, a net voltage is induced in the secondary windings which has a phase in accordance with the sense of the displacement and a magnitude directly proportional to the extent of the displacement.

My invention will best be understood by reference to the accompanying drawings, together with the following detailed description, of a preferred embodiment thereof.

Figure 1:
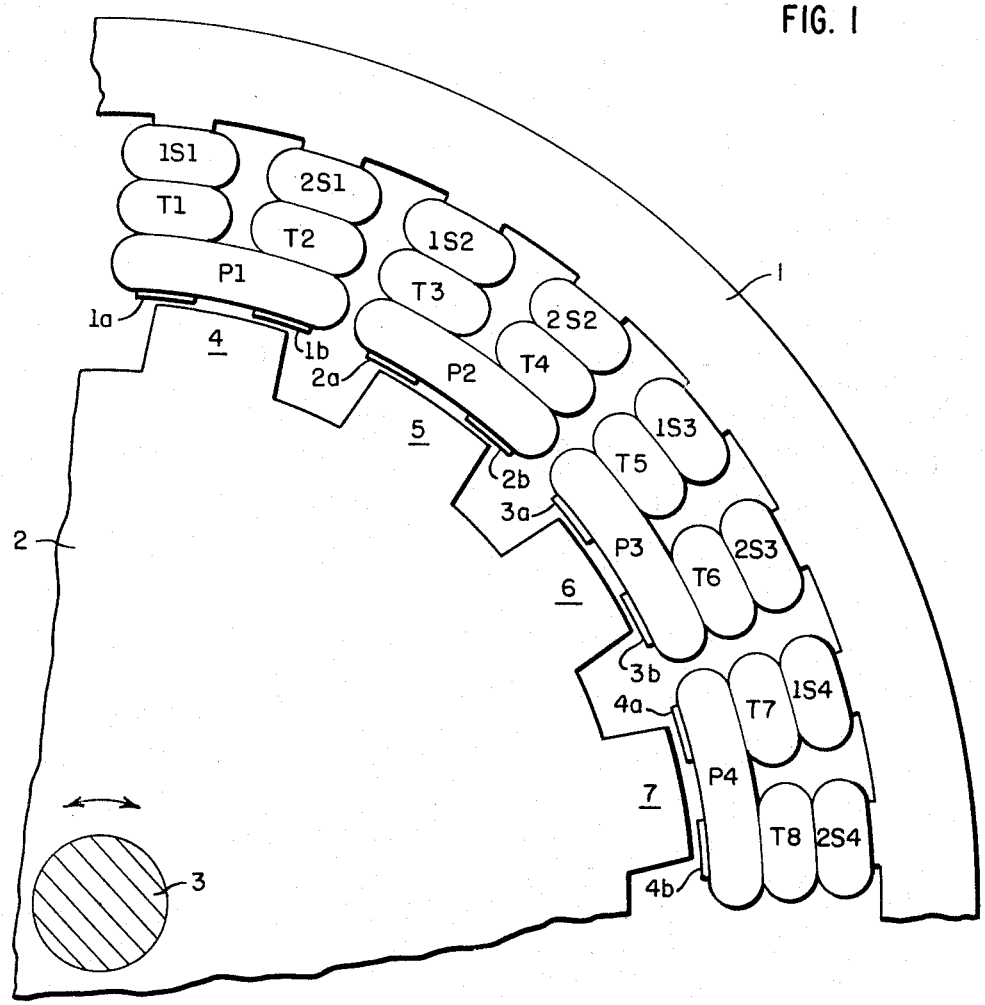
FIGURE 1 is a fragmentary end view of a variable transformer in accordance with my invention.

Referring now to FIG. 1, I have shown the first element of the variable transformer of my invention as an outer stator 1, assumed to be fixed with respect to a suitable support, not shown, for relative angular movement with respect to the second element, here shown as an inner rotor 2 mounted on a shaft 3, the latter being rotatable relative to the stator 1. It will be apparent to those skilled in the art that either element could be the outer one, and either could be the stator or the rotor, without departing from the scope of my invention.

The stator 1 may comprise a series of laminations stacked normal to the plane of FIG. 1 in a conventional manner, not shown, and is provided with a plurality of pole pieces, such as the pole piece 1a. These pole pieces are grouped in pairs, such as the pair comprising the pole pieces 1a and 1b, and on each such pair a coil is wound, which forms a portion of the primary winding of the transformer. Thus, the primary coil P1 is wound on the pole pieces 1a and 1b, the primary coil P2 is wound on the pole pieces 2a and 2b, and so on.

A coil forming a portion of the secondary windings of the transformer is wound on each pole piece. These coils are grouped into two sets. One set comprises the coils 1S1, 1S2, 1S3, etc., which are wound, respectively, on the pole pieces 1a, 2a, 3a, etc. A second set comprises the coils 2S1, 2S2, 2S3, etc., which are wound on the pole pieces 1b, 2b, 3b, etc., respectively.

Preferably, a coil forming a portion of a tertiary winding of the transformers is also wound on each pole piece. Thus, tertiary windings T1, T2, T3, etc., are wound on pole pieces 1a, 1b, 2a, 2b, etc., respectively. The tertiary winding, as such, does not form a part of my invention, but may be included in the manner and for the purposes described in U.S. Patent No. 2,882,484 to Edward L. Swainson for Null Shifting Device for Variable Dynamo Transformers, which was issued April 14, 1959, and is assigned to my assignee.

The rotor 2 may also comprise a series of laminations stacked normal to the plane of FIG. 1, and is provided with a series of projecting teeth such as 4, 5, 6, 7, etc., one for each pair of pole pieces on the stator 1. These teeth cooperate with the pole pieces to provide variable inductive coupling between the various windings on the pole pieces, in a manner that will be described in detail below.

Figure 2:
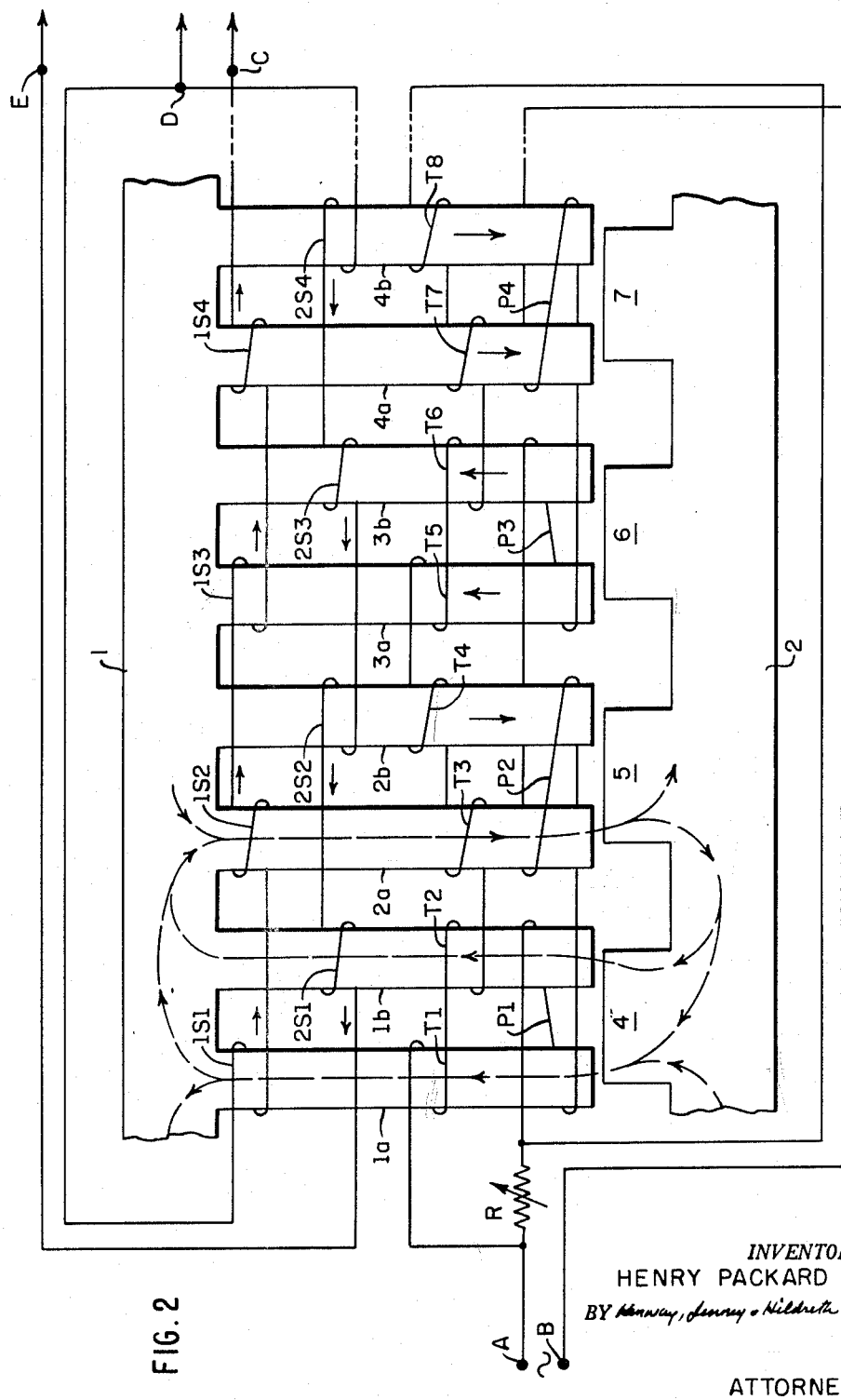
FIGURE 2 is a schematic diagram of the transformer of FIG. 1, developed linearly to illustrate the arrangement of the windings and the mode of operation.

FIGURE 2 shows the manner in which the primary, secondary, and tertiary windings of the transformer of FIG. 1 may be interconnected to form a linear transducer in accordance with my invention. For purposes of illustration, the rotary transformer of FIG. 1 has been shown schematically in the form of a linear development, and with parts somewhat distorted in shape to facilitate an understanding of the mode of operation of the transformer. However, while this is the primary purpose of FIG. 2, it also serves to illustrate a possible physical arrangement of the parts suitable for use as a linear motion transducer, as distinguished from the use of the apparatus arranged as shown in FIG. 1 as an angular shaft motion transducer.

As shown in FIG. 2, the coils forming the primary winding of the transformer are wound alternately clockwise and counter-clockwise, such that the relative direction of the flux induced in the pole pieces by these windings alternates from pair to pair of the pole pieces. Thus, coil P1 is wound on the pole pieces 1a and 1b in a sense opposite to that in which coil P2 is wound on the pole pieces 2a and 2b. The external terminals of the primary coils, which may be of any selected number depending on the number of poles of the transformer, are connected to terminals A and B of a suitable source of alternating voltage in series with a resistor R. The function of the resistor R will be described below.

The first group of secondary windings 1S1, 1S2, etc., are wound alternately clockwise and counter-clockwise, as shown, and are so connected between a first output terminal C and a center tap terminal D that the voltages induced in them by the primary windings P1, P2, etc., are in series-aiding relationship, illustrated for a particular instant as being in the sense shown by the small horizontal arrows adjacent the output leads of the coils. The second set of secondary windings 2S1, 2S2, etc., are also wound in alternately clockwise and coutner-clockwise senses, such that a coil wound clockwise is on a pole piece linking the same primary winding as a coil in the other set wound counter-clockwise. For example, the secondary winding 2S2 is wound clockwise and the secondary winding 1S2 is wound counter-clockwise, and both link the primary winding P2.

The second set of secondary windings 2S1, 2S2, etc., is connected between an output terminal E and the center tap terminal D such that voltages in the relative sense indicated by the small horizontal arrows are induced in them in series-aiding relationship. As may be seen by tracing from the output terminal E to the output terminal C, if the voltage induced in each of the secondary coils is equal, those in the first set will be equal and opposite to those of the second set, and no output voltage will appear between terminals E and C.

The tertiary windings T1, T2, T3, etc., are wound such that each pair wound on pole pieces on which a single primary coil is wound are wound in the same sense, and alternate pairs are wound in opposite senses. The external terminals of these tertiary windings are connected across the resistor R, which may be a variable resistance as shown, to equate the mechanical null of the transformer to its electrical null in the manner taught in the above-cited Patent No. 2,882,484.

The teeth of the element 2, such as the teeth 4, 5, 6 and 7, cooperate with the pole pieces of the wound element 1 to adjust the mutual inductance between the windings. In the position shown, in which the teeth such as 4 are centered with respect to an associated pair of pole pieces such as 1a and 1b on which a primary winding such as P1 is wound, the mutual inductance between the primary windings and the secondary windings of the first set is equal to the mutual inductance between the primary winding and the secondary windings of the second set. Considering the secondary windings 1S1 and 1S2, these windings are linked by flux flowing through a magnetic path including the pole piece 1a, the body of the element 1, the pole piece 2a, an air gap between the pole piece 2a and the tooth 5, the tooth 5, the body of the element 2, the tooth 4, and over an air gap back to the pole piece 1a. Considering the secondary windings 2S1 and 2S2, these coils are linked by flux which flows in a path including the pole piece 1b, the body of the element 1, the pole piece 2b, an air gap, the tooth 5, the body of the element 2, the tooth 4, and through an air gap to the pole piece 1b. As will be apparent, each coil is also linked by flux flowing through a path complementary to the one just described, and which also links its other neighboring mate in the same set; for example, a second component of flux which links the coil 1S2 and also links the coil 1S3 as complementary to the path just described which links the coils 1S1 and 1S2.

Assuming next that the element 2 is shifted to the right in FIG. 2, the effective air gaps between the pole pieces 1b and the tooth 4 and between the pole piece 2b and the tooth 5 are both decreased, whereas the corresponding air gaps between the pole piece 1a and the tooth 4 and the pole piece 2a and the tooth 5 are both increased. Thus, the mutual inductance between the primary windings P1 and P2 and the secondary windings 2S1 and 2S2 will be increased, whereas the mutual inductance between the primary windings and the secondary windings 1S1 and 1S2 will be decreased. Thus, a larger voltage will be induced in the second set of secondary windings and a smaller voltage will be induced in the first set of secondary windings. I have found that the magnitude of the difference between these voltages will be essentially linear in the relative displacement of the elements 1 and 2, over a range of movement in which the teeth of element 2 do not sensibly interact with the pole pieces adjacent to those with which they are associated in the null position of the elements. In a rotary device of the type shown in FIG. 1, the range will be set by the width of the poles employed.

Figure 3:
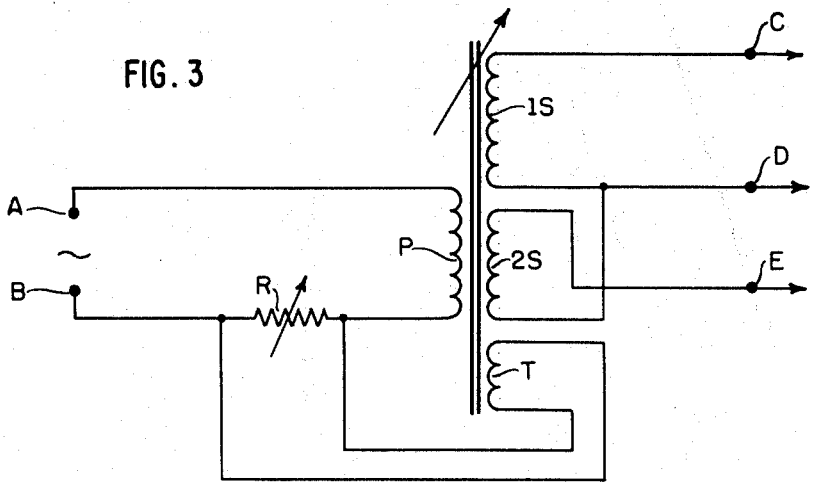
FIGURE 3 is a schematic wiring diagram of the net equivalent circuit of the variable transformer of FIGURES 1 and 2.

Referring now to FIG. 3, an equivalent circuit of the transformer of FIGS. 1 and 2 is shown in which the electrical function of the transformer is made clear. Thus, in this equivalent circuit it is apparent that the effect of the primary winding P, comprising the coils P1, P2, etc., on the secondary windings 1S and 2S, is to produce no net output voltage when the voltage induced in the set of windings 1S is equal to the voltage induced in the set of windings 2S, since these voltages will be 180° out of phase in the circuit between the output terminal C and the output terminal E. When the voltage in either the windings 1S or the windings 2S predominates, an output voltage having a phase equal to the phase of the voltage induced in the predominating winding and a magnitude equal to the difference between the voltages will appear between the output terminals C and E.

Figure 4:
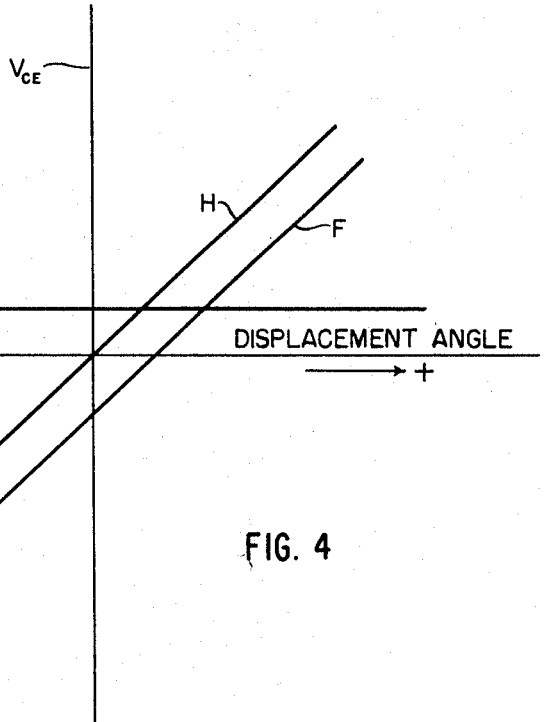
FIGURE 4 is a graph of a typical relationship between shaft angle and output voltage of the variable transformers of FIGURES 1–3.

Referring to FIG. 4, in the absence of the tertiary winding T of FIG. 3, which is comprised of the windings T1, T2 and T3, etc., of FIGS. 1 and 2, the output voltage $V_{ce}$ between terminals C and E may be displaced from electrical null at zero displacement in the manner indicated by the line F. The tertiary winding T serves to induce a constant voltage G in the secondary windings, in one sense in the set 1S and in an opposite sense in the set 2S, such that the net output voltage may be adjusted to follow the line H, which intersects the origin of the graph of FIG. 4.

Referring again to FIGURE 3, the three output leads C, D and E of the variable transformer of my invention may be employed to energize a conventional push-pull amplifier, with the center tap D being connected to the reference terminal of the amplifier and terminals C and E supplying the push-pull inputs. Alternatively, the center tap terminal D may be dispensed with, and terminals C and E employed to energize a conventional output circuit having two input terminals. Since it is unnecessary to reference any of the output terminals to the stator or rotor of the transformer, it will be apparent that the transformer is adapted for use in any system regardless of the reference potential requirements of the system.

While I have described only one embodiment of my invention in detail, many changes and variations will be apparent to those skilled in the art upon reading my description, and such can obviously be made without departing from the scope of my invention.

Having thus described my invention, what I claim is:

1. A variable transformer, comprising a first ferromagnetic element having a plurality of projecting pole pieces, a second ferromagnetic element provided with a projecting tooth for each pair of pole pieces on said first element, said elements being mounted for relative movement with said teeth confronting said pole pieces, a first series of secondary coils connected in series and wound on alternate pole pieces, said coils being alternately oppositely wound, a second series of secondary coils connected in series and wound on the remaining alternate pole pieces, said second series of coils being alternately oppositely wound, and a series of primary coils, each wound on a pair of pole pieces on which a pair of oppositely wound secondary coils from different series are wound, said primary coils being alternately oppositely wound, said first and second series of secondary coils being connected in series opposition.

2. The variable transformer of claim 1, further comprising a tertiary coil wound on each pole piece, said tertiary coils being interconnected in series and wound in senses selected to induce opposite net voltages of equal magnitudes in said first and second series of secondary coils in a reference relative position of said elements in response to an alternating voltage applied to said tertiary coils.

3. A variable rotary transformer comprising concentric relatively rotatable ferromagnetic elements, a series of projecting pole pieces on the periphery of one of said elements adjacent the other element, a series of projecting teeth, one for each pair of pole pieces, on the periphery of the other of said elements confronting said pole pieces, a first series of secondary windings on alternate pole pieces, a second series of secondary windings on the remaining alternate pole pieces, and a series of alternately oppositely wound primary windings, each on a pair of pole pieces on which a pair of secondary windings from different series are wound, said primary windings being connected in alternate series opposition, the windings of said first and second secondary series being connected in alternate series opposition, and said first and second series being connected together in series opposition.

4. In the variable rotary transformer of claim 3, a tertiary coil wound on each pole piece, the coils on each pair of pole pieces on which a common primary winding is wound being connected in series opposition, means for energizing said primary windings with an alternating voltage of constant magnitude, and means for energizing said tertiary coils with an adjustable fraction of said voltage.

5. Apparatus of the class described, comprising a ferromagnetic element provided with an array of projecting pole pieces, a first series of alternately oppositely wound coils on alternate pole pieces of said array, a second series of alternately oppositely wound coils on the remaining alternate pole pieces of said array, said first series being connected to said second series in series opposition, a series of alternately oppositely wound primary coils, each on a pair of pole pieces on which oppositely wound secondary coils from different series are wound, and means for simultaneously increasing the mutual inductance between the primary coils and the secondary coils of one series and decreasing the mutual inductance between the primary coils and the secondary coils of the second series.

6. In combination with the apparatus of claim 5, means for inducing a net voltage of constant magnitude in one sense in one series of secondary coils, means for inducing a net voltage of constant magnitude in an opposite sense in the other series of secondary coils, the magnitudes of said induced voltages being proportional to the mutual inductances of the secondary coils with respect to the primary coils.

References Cited in the file of this patent
UNITED STATES PATENTS

| | | |
|---|---|---|
| 2,882,484 | Swainson | Apr. 14, 1959 |
| 3,041,486 | Moffitt | June 26, 1962 |